United States Patent
Ess et al.

(10) Patent No.: US 8,213,684 B2
(45) Date of Patent: Jul. 3, 2012

(54) MOTION ESTIMATING DEVICE

(75) Inventors: Andreas Ess, Zurich (CH); Bastian Leibe, Aachen (DE); Konrad Schindler, Darmstadt (DE); Luc Van Gool, Antwerp (BE); Kenichi Kitahama, Nagoya (JP); Ryuji Funayama, Yokohama (JP)

(73) Assignees: Swiss Federal Institute of Technology Zurich, Zurich (CH); Toyota Jidosha Kabushiki Kaisha, Toyota-shi (JP)

( * ) Notice: Subject to any disclaimer, the term of this patent is extended or adjusted under 35 U.S.C. 154(b) by 530 days.

(21) Appl. No.: 12/488,878

(22) Filed: Jun. 22, 2009

(65) Prior Publication Data

US 2010/0027847 A1 Feb. 4, 2010

(30) Foreign Application Priority Data

Jun. 23, 2008 (JP) .............................. P2008-163626

(51) Int. Cl.
*G06K 9/00* (2006.01)

(52) U.S. Cl. ........ 382/104; 340/436; 340/944; 700/253; 700/255

(58) Field of Classification Search .................. 382/103, 382/104, 106, 107; 348/154, 155, 169, 171; 340/436, 937, 944; 701/482, 519, 523; 901/1; 700/245, 253, 255, 259
See application file for complete search history.

(56) References Cited

U.S. PATENT DOCUMENTS

| | | | | |
|---|---|---|---|---|
| 5,525,883 A | * | 6/1996 | Avitzour | 318/587 |
| 6,826,293 B2 | * | 11/2004 | Matsunaga | 382/106 |
| 8,108,119 B2 | * | 1/2012 | Southall et al. | 701/96 |
| 2003/0076417 A1 | * | 4/2003 | Thomas et al. | 348/169 |
| 2004/0062419 A1 | * | 4/2004 | Roh et al. | 382/104 |
| 2004/0101161 A1 | * | 5/2004 | Roh et al. | 382/103 |
| 2005/0002558 A1 | * | 1/2005 | Franke et al. | 382/154 |
| 2005/0234679 A1 | * | 10/2005 | Karlsson | 702/181 |
| 2006/0217838 A1 | * | 9/2006 | Sugino et al. | 700/245 |
| 2007/0150097 A1 | * | 6/2007 | Chae et al. | 700/245 |
| 2008/0059068 A1 | * | 3/2008 | Strelow et al. | 701/214 |
| 2010/0222925 A1 | * | 9/2010 | Anezaki | 700/253 |

FOREIGN PATENT DOCUMENTS

JP 09-044681 2/1997

(Continued)

OTHER PUBLICATIONS

Office Action issued Mar. 13, 2012 in Japanese Patent Application No. P2008-163626 filed Jun. 23, 2008.

*Primary Examiner* — Sath V Perungavoor
*Assistant Examiner* — Shervin Nakhjavan
(74) *Attorney, Agent, or Firm* — Oblon, Spivak, McClelland, Maier & Neustadt, L.L.P.

(57) ABSTRACT

A motion estimating device first detects mobile objects Oi and Oi' in continuous image frames T and T', and acquires image areas Ri and Ri' corresponding to the mobile objects Oi and Oi'. Then, the motion estimating device removes the image areas Ri and Ri' corresponding to the mobile objects Oi and Oi' in the image frames T and T', extracts corresponding point pairs Pj of feature points between the image frames T and T' from the image areas having removed the image areas Ri and Ri', and carries out the motion estimation of the autonomous mobile machine between the image frames T and T' on the basis of the positional relationship of the corresponding point pairs Pj of feature points.

4 Claims, 6 Drawing Sheets

FOREIGN PATENT DOCUMENTS

| | | |
|---|---|---|
| JP | 11-051650 | 2/1999 |
| JP | 2005-115420 | 4/2005 |
| JP | 2007-278871 | 10/2007 |
| JP | 2008-008797 | 1/2008 |
| JP | 2008-503757 | 2/2008 |

* cited by examiner

MOTION ESTIMATING DEVICE

BACKGROUND OF THE INVENTION

1. Field of the Invention

The present invention relates to a motion estimating device that estimates the motion state of an autonomous mobile machine, such as an automatic driving vehicle, a mobile robot, or the like.

2. Related Background Art

As a motion estimating device which estimates the motion state of an autonomous mobile machine, for example, Japanese Patent Unexamined Application Publication (Translation of PCT Application) No. 2008-503757 describes a motion estimating device which acquires an image sequence of an ambient environment by using a video camera, processes the image sequence in accordance with, for example, video processing technique, and performs motion estimation with respect to the ambient environment.

SUMMARY OF THE INVENTION

Like the related art, when motion estimation is performed by using the images of the ambient environment, for example, the motion state of the autonomous mobile machine is estimated on the basis of the corresponding feature points extracted from the respective images. In this case, however, the corresponding feature points of the respective images are assumed to be present on stationary objects, so when the extracted corresponding feature points are present on mobile objects (vehicles, pedestrians, or the like), it may be impossible to correctly perform motion estimation of the autonomous mobile machine.

It is an object of the invention to provide a motion estimating device which can accurately perform motion estimation of an autonomous mobile machine even if a mobile object exists in an image.

An aspect of the invention provides a motion estimating device which captures images of an ambient environment of an autonomous mobile machine by using an imaging device, and estimates the motion state of the autonomous mobile machine on the basis of change in the respective captured images of the ambient environment. The motion estimating device includes an image area removing section detecting mobile objects which exist in the respective captured images of the ambient environment, and removing image areas corresponding to the mobile objects, a corresponding feature point extracting section extracting corresponding feature points from the respective captured images having removed the image areas corresponding to the mobile objects, and a first estimating section estimating the motion state of the autonomous mobile machine on the basis of the positional relationship between the corresponding feature points of the respective captured images.

With this motion estimating device, the mobile objects which exist in the respective captured images of the ambient environment of the autonomous mobile machine acquired by the imaging device are detected, and the image areas corresponding to the mobile objects are removed. Then, the corresponding feature points are extracted from the respective captured images having removed the image areas corresponding to the mobile objects. Accordingly, there is no inconsistency that the corresponding feature points which actually exist on the mobile objects are extracted as being on the stationary objects in the captured images. Therefore, even if a mobile object exists in each captured image, the motion estimation of the autonomous mobile machine can be accurately performed.

The motion estimating device according to the aspect of the invention may further include a determining section determining whether or not the number of corresponding feature points is larger than a predetermined value. When the determining section determines that the number of corresponding feature points is larger than the predetermined value, the first estimating section may estimate the motion state of the autonomous mobile machine on the basis of the positional relationship between the corresponding feature points of the respective captured images. In this case, a sufficient number of corresponding feature points are used for the motion estimation, and as a result, the motion estimation of the autonomous mobile machine can be further accurately performed.

The motion estimating device according to the aspect of the invention may further include a second estimating section estimating the motion state of the autonomous mobile machine on the basis of the previous positions of the autonomous mobile machine when the determining section determines that the number of corresponding feature points is not larger than the predetermined value. In this case, even if there are a small number of stationary objects which exist in the respective captured image, the motion estimation of the autonomous mobile machine can be performed.

The motion estimating device according to the aspect of the invention may further include a position detecting section acquiring the position of the mobile object with respect to the imaging device, a speed detecting section acquiring the speed of the mobile object, a temporary estimating section estimating the temporary motion state of the autonomous mobile machine on the basis of the previous positions of the autonomous mobile machine when the determining section determines that the number of corresponding feature points is not larger than the predetermined value, and a second estimating section estimating the motion state of the autonomous mobile machine on the basis of the position of the mobile object with respect to the imaging device, the speed of the mobile object, and the temporary motion state of the autonomous mobile machine. In this case, even if there are a small number of stationary objects which exist in each captured image, the motion estimation of the autonomous mobile machine can be performed insofar as there are a necessary number of mobile objects in each captured image.

According to the aspect of the invention, even if a mobile object exists in an image, the motion estimation of the autonomous mobile machine can be accurately performed. Therefore, for example, the subsequent motion control of the autonomous mobile machine can be easily performed.

DESCRIPTION OF THE PREFERRED EMBODIMENTS

Hereinafter, a preferred embodiment of a motion estimating device according to the invention will be described in detail with reference to the drawings.

Figure 1:
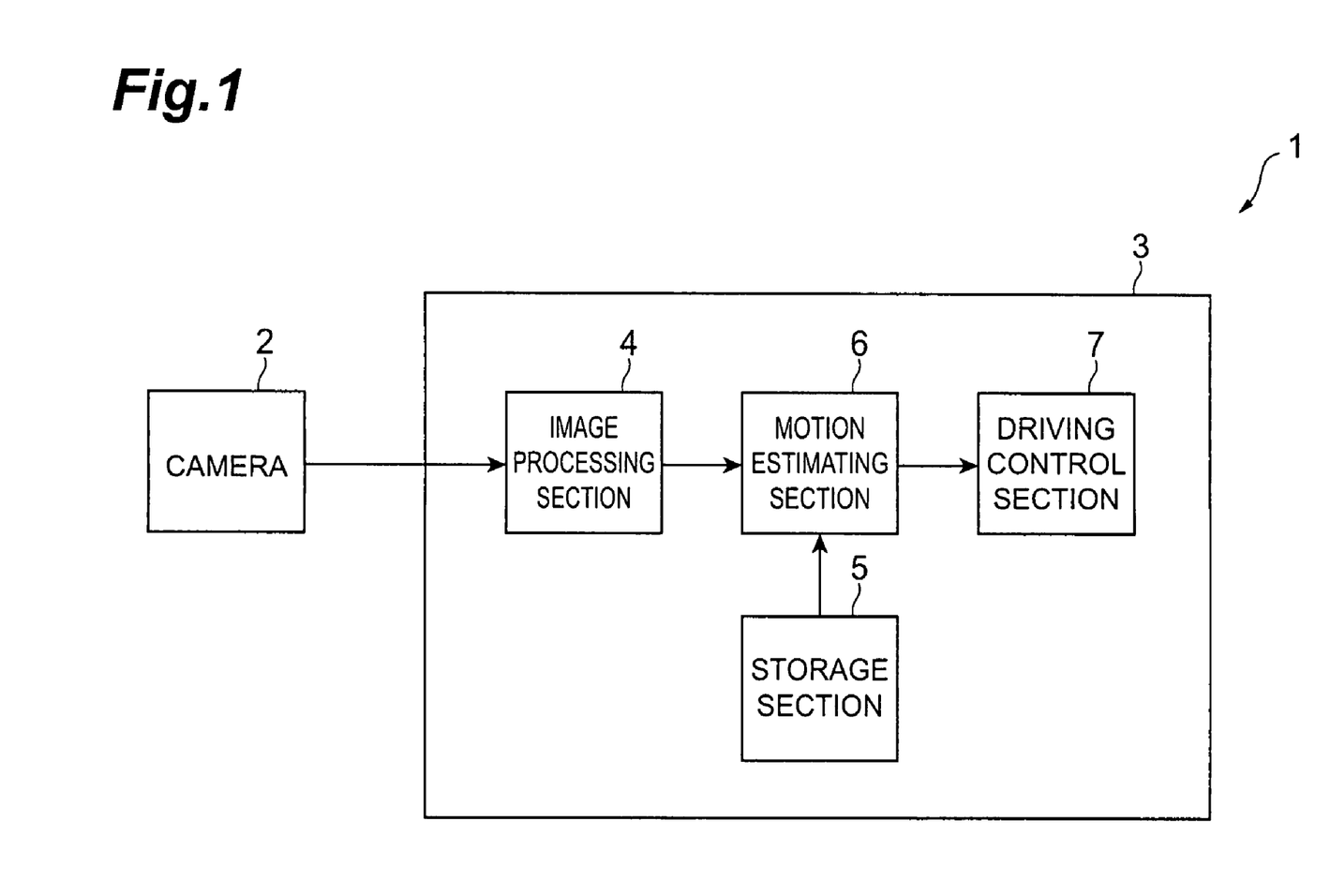
FIG. 1 is a block diagram showing the schematic configuration of an embodiment of a motion estimating device according to the invention.

FIG. 1 is a block diagram showing the schematic configuration of an embodiment of a motion estimating device according to the invention. A motion estimating device 1 of this embodiment is a device which is mounted on an autonomous mobile machine, such as an automatic driving vehicle, a mobile robot, or the like, and estimates the state of self-motion (movement, rotation, or the like) of the autonomous mobile machine.

The motion estimating device 1 includes a camera 2 capturing images of the ambient environment of the autonomous mobile machine, and an ECU (Electronic Control Unit) 3 having a CPU, a memory, such as a ROM, a RAM, or the like, an input/output circuit, and the like. The single camera 2 or two or more cameras 2 may be provided.

The ECU 3 has an image processing section 4, a storage section 5, a motion estimating section 6, and a driving control section 7. The image processing section 4 performs image processing, such as filter processing, binarization processing, feature extraction processing, and the like, on the captured images of the ambient environment of the autonomous mobile machine acquired by the camera 2, and generates image frames.

The storage section 5 stores in advance data (mobile object data) regarding the shapes or postures of mobile objects, such as vehicles, for example, automobiles or the like, two-wheeled vehicles, bicycles, pedestrians, and the like, which move independently from the autonomous mobile machine. As mobile object data, a lot of data is registered for each type of mobile object.

The motion estimating section 6 receives the image frames obtained by the image processing section 4 as input, performs a predetermined processing on the image frames by using mobile object data stored in the storage section 5, and estimates how the autonomous mobile machine is moving.

The driving control section 7 controls the driving system of the autonomous mobile machine (in an automatic driving vehicle, including the steering system) in accordance with the motion state estimated by the motion estimating section 6.

Figure 2:
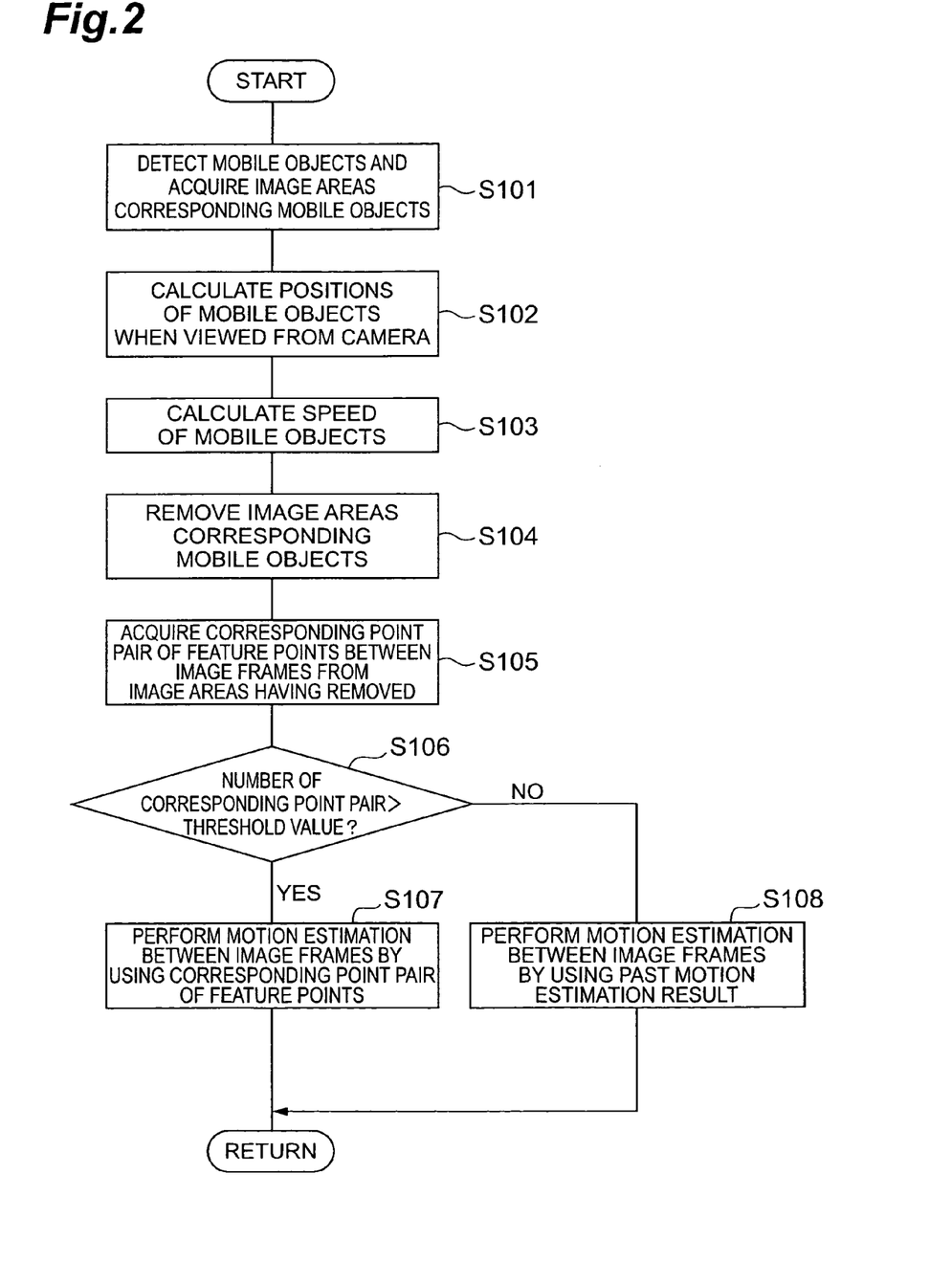
FIG. 2 is a flowchart showing the details of the procedure of a motion estimation processing which is carried out by a motion estimating section shown in FIG. 1.

FIG. 2 is a flowchart showing the details of the procedure of a motion estimation processing which is carried out by the motion estimating section 6.

Referring to FIG. 2, first, a latest image frame T' and a previous image frame T are prepared, mobile objects Oi and Oi' which exist in the image frames T and T' are detected, and image areas Ri and Ri' corresponding to the mobile objects Oi and Oi' are acquired (Step S101). Note that i=1 to N (N is the number of detected mobile objects).

Specifically, pattern recognition is performed by comparing mobile object candidates, which exist in the image frames T and T', with mobile object data stored in the storage section 5, and when the similarity between the mobile object candidates and any mobile object data is equal to or larger than a predetermined value, the relevant mobile object candidates are set as the mobile objects Oi and Oi'.

Figure 3:
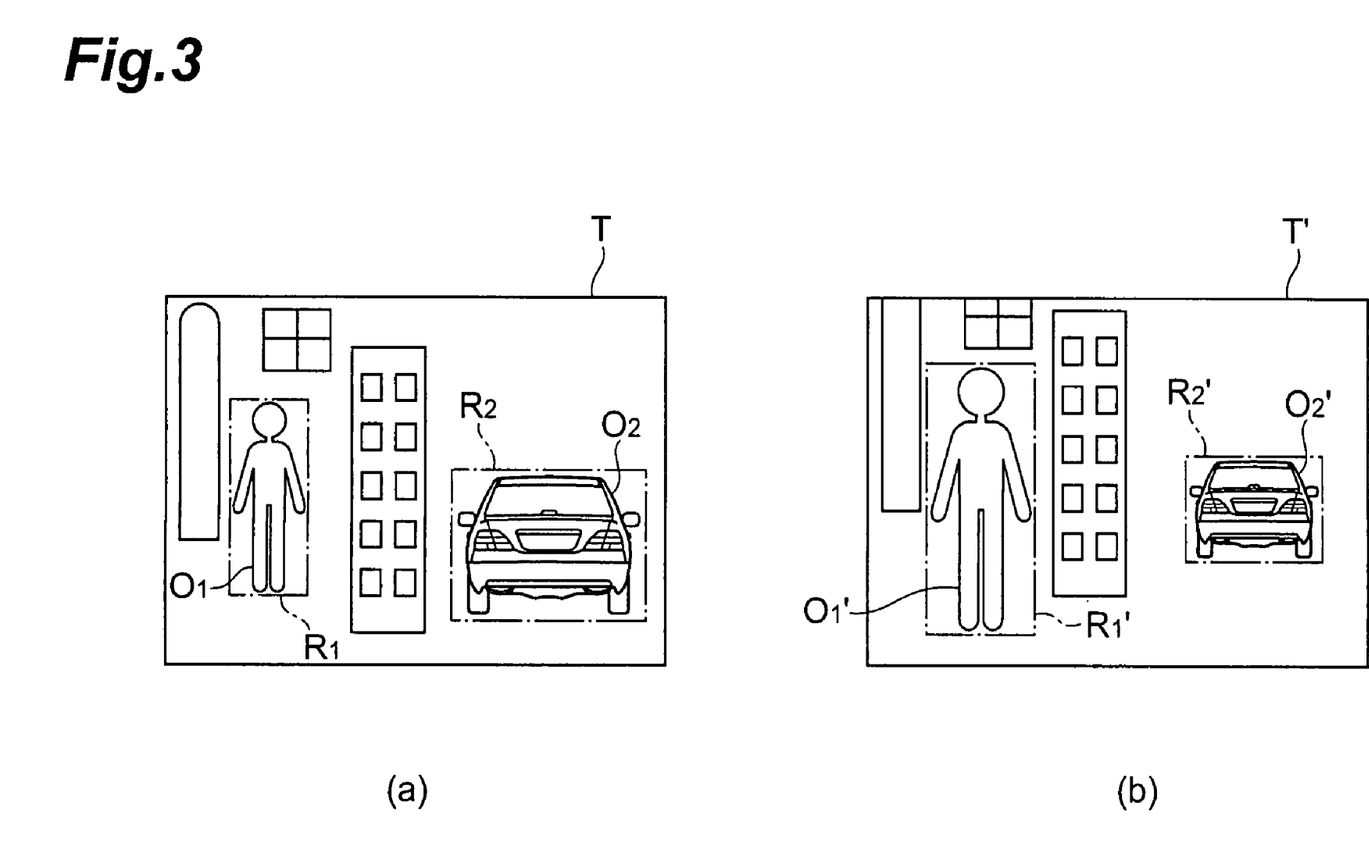
FIG. 3 is a schematic view showing an example of image frames which are obtained by an image processing section shown in FIG. 1.

FIG. 3 shows an example of the image frames T and T'. In the image frames T and T', there are image areas R1 and R1' corresponding to mobile objects (pedestrians) O1 and O1' and image areas R2 and R2' corresponding to mobile objects (vehicles) O2 and O2'. Further, in the image frames T and T', there are three stationary objects (buildings and the like).

Next, the positions Pi(Xi,Yi,Zi) and Pi'(Xi',Yi',Zi') of the mobile objects Oi and Oi' when viewed from the camera 2 are calculated by using a known method (Step S102).

The movement distance of each mobile object is acquired from the position coordinates of the mobile object when viewed from the camera 2, and the speed Vi of the mobile object is calculated on the basis of the movement distance and the acquisition time interval (for example, 100 ms) of the captured images (Step S103). In this case, in order to increase the calculation accuracy of the speed Vi, the speed Vi of the mobile object is desirably calculated by using information regarding the latest two image frames T and T' and a large number of past image frames.

Figure 4:
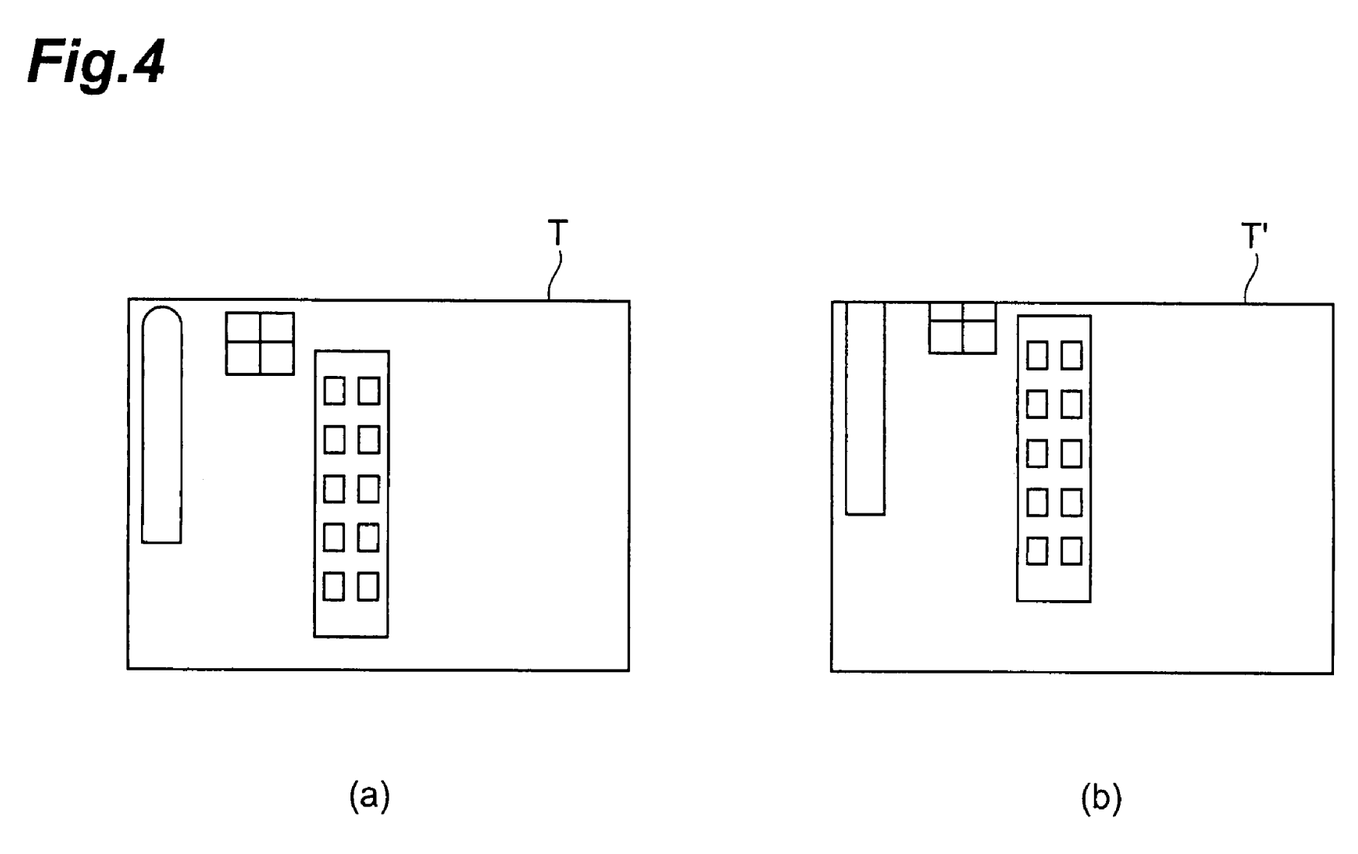
FIG. 4 is a schematic view showing a state where image areas corresponding to mobile objects are removed from the image frames shown in FIG. 3.

Next, the image areas Ri and Ri' corresponding to the mobile objects Oi and Oi' in the image frames T and T' are removed (Step S104). For example, if this processing is performed on the image frames T and T' shown in FIG. 3, as shown in FIG. 4, images are obtained in which the image areas R1 and R1' corresponding to the mobile objects O1 and O1' and the image areas R2 and R2' corresponding to the mobile objects O2 and O2' are removed, and the three stationary objects remain.

Next, a corresponding point pair Pj of feature points (where j=1 to M: M is the number of corresponding point pairs) between the image frames T and T' is acquired from the image areas having removed the image areas Ri and Ri' corresponding to the mobile objects Oi and Oi' (Step S105). The feature points are points which represent the characteristic portions of the stationary objects remaining in the image frames T and T'.

Next, it is determined whether or not the number M of corresponding point pairs of feature points (corresponding feature points) is larger than a prescribed threshold value (Step S106). When it is determined that the number M of corresponding point pairs Pj of feature points is larger than the threshold value, the motion estimation of the autonomous mobile machine between the image frames T and T' is performed on the basis of the positional relationship of the corresponding point pair Pj of feature points (Step S107). In this case, as the method for the motion estimation, a factorization method (for example, see C. Tomasi and Kanade, Shape and Motion from Image Streams under Orthography: A Factorization Method, International Journal of Computer Vision, pp. 137-154, 1992) or the like is used.

When it is determined that the number M of corresponding point pairs Pj of feature points is not larger than the threshold value, the motion estimation of the autonomous mobile machine between the image frames T and T' is performed by using the past motion estimation result of the autonomous mobile machine (Step S108). In this case, the motion estimation is performed, for example, by extrapolation of the past movements of the autonomous mobile machine.

In Step S108, the motion estimation of the autonomous mobile machine may be performed by using the positional relationship between the corresponding point pair Pj of feature points in the image frames T and T' as well as the past motion estimation result of the autonomous mobile machine.

Steps S101 and S104 of the storage section 5 and the motion estimating section 6 in the ECU 3 constitute an image area removing section which detects mobile objects which exist in the respective captured images of the ambient environment, and removes image areas corresponding to the mobile objects. Step S105 of the motion estimating section 6 constitutes a corresponding feature point extracting section which extracts corresponding feature points from the respective captured images having removed the image areas corresponding to the mobile objects. Step S107 of motion estimating section 6 constitutes a first estimating section which estimates the motion state of the autonomous mobile machine on the basis of the positional relationship between the corresponding feature points of the respective captured images.

Step S106 of the motion estimating section 6 constitutes a determining section which determines whether or not the number of corresponding feature points is larger than a predetermined value. Step S108 of the motion estimating section 6 constitutes a second estimating section which, when the determining section determines that the number of corresponding feature points is not larger than the predetermined value, estimates the motion state of the autonomous mobile machine on the basis of the past positions of the autonomous mobile machine.

Figure 5:
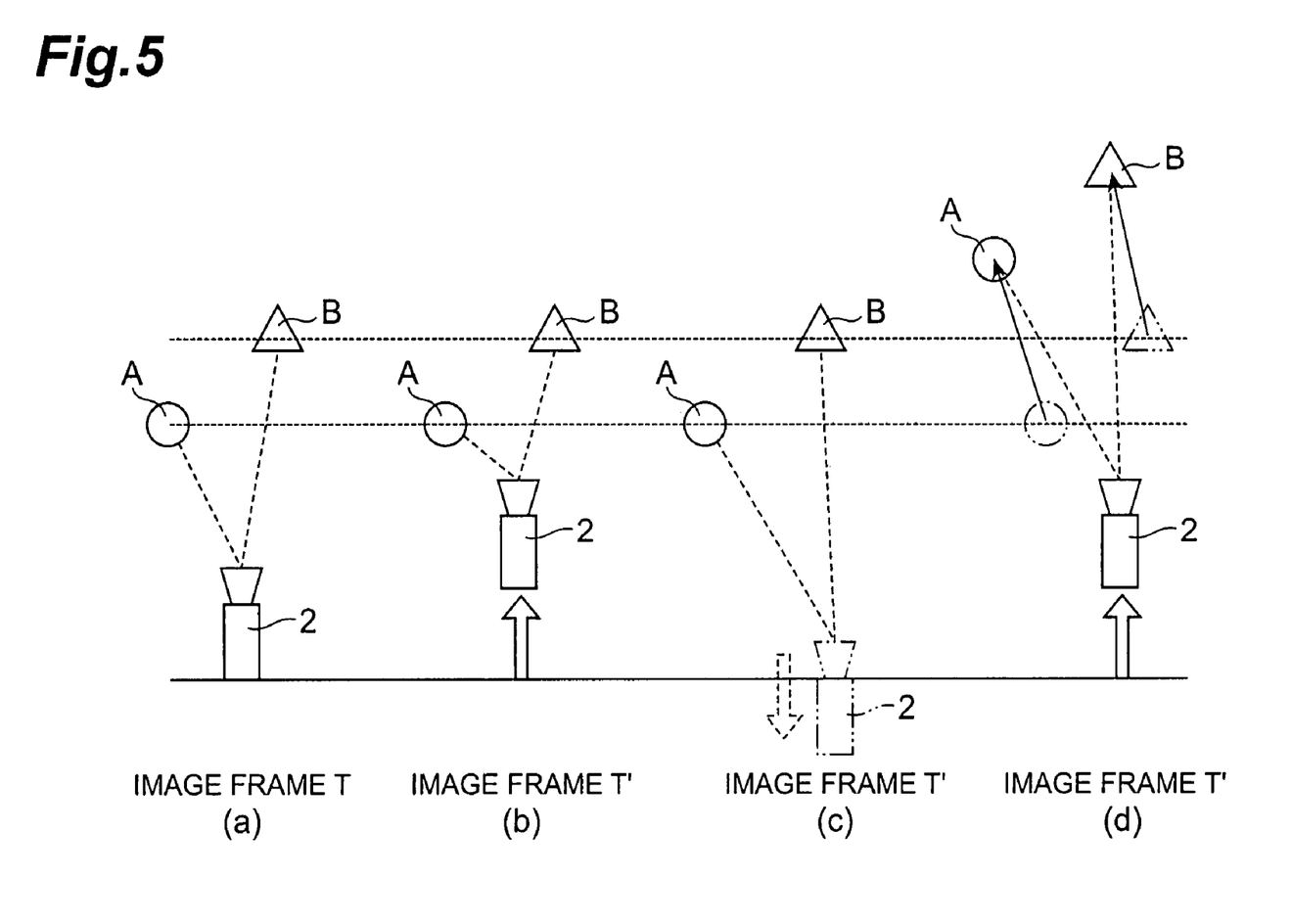
FIG. 5 is a diagram schematically showing an operation when the motion estimating device shown in FIG. 1 estimates the motion state of an autonomous mobile machine.

FIG. 5 schematically shows an operation when the motion estimating device 1 of this embodiment estimates the motion state of the autonomous mobile machine. Here, as shown in FIG. 5(a), it is assumed that known objects A and B are present in front of the traveling autonomous mobile machine. In this case, the known objects A and B are imaged by the camera 2, so an image frame T with the known objects A and B is acquired.

When the known objects A and B are stationary objects, and a sufficient number of feature points are present on the stationary objects, as shown in FIG. 5(b), due to the traveling of the autonomous mobile machine, the camera 2 approaches the stationary objects. Then, the stationary objects at that time are imaged by the camera 2 to acquire an image frame T', and corresponding point pairs of feature points between the image frames T and T' are obtained. Therefore, the motion state of the autonomous mobile machine can be accurately estimated.

When the motion estimation is performed assuming that the known objects A and B, which are actually mobile objects, are stationary objects, as shown in FIG. 5(c), even if the autonomous mobile machine is actually going forward, it is erroneously estimated that the autonomous mobile machine is stopped or going backwards.

In contrast, in this embodiment, when the known object A and B are mobile objects, this situation can be recognized. Therefore, the mobile objects after being moved are imaged by the camera 2 to acquire the image frame T', and the past motion estimation result of the autonomous mobile machine is used, thereby estimating the motion state of the autonomous mobile machine.

As described above, according to this embodiment, the mobile objects Oi and Oi' in the continuous image frames T and T' are detected, the image areas Ri and Ri' corresponding to the mobile objects Oi and Oi' are removed, the corresponding point pairs Pj of feature points in the resultant image frames T and T' are extracted, and when the number of corresponding point pairs Pj is larger than the threshold value, the motion state of the autonomous mobile machine is estimated on the basis of the positional relationship of the corresponding point pairs Pj of feature points between the image frames T and T'. In this way, when the mobile objects exist in the image frames, the image areas corresponding to the mobile objects are removed from the image frames. Thus, as shown in FIG. 5(c), the motion estimation is prevented from being performed assuming that the mobile objects are stationary objects. In this case, even if the mobile object is stopped or the change in the speed of the mobile object is close to zero, since the image area corresponding to the mobile object is removed, an estimation error due to the subtle movement of a mobile object can be eliminated. Therefore, even if multiple mobile objects exist in the vicinity of the autonomous mobile machine, the motion estimation of the autonomous mobile machine can be performed with high accuracy.

When the number of corresponding point pairs Pj of feature points is smaller than the threshold value, the past motion estimation result of the autonomous mobile machine is used for the motion estimation. Thus, even if a small number of stationary object exist in the image frame, the motion state of the autonomous mobile machine can be estimated.

When the motion estimation is performed by using the GPS (Global Positioning System), the motion estimation may become difficult since electric waves from the GPS satellite are blocked by buildings or the like. Further, when the motion estimation is performed by detecting the rotation speed of the wheels, the motion estimation may become difficult due to skidding. In contrast, according to the motion estimating device 1 of this embodiment, such inconsistency can be avoided.

Figure 6:
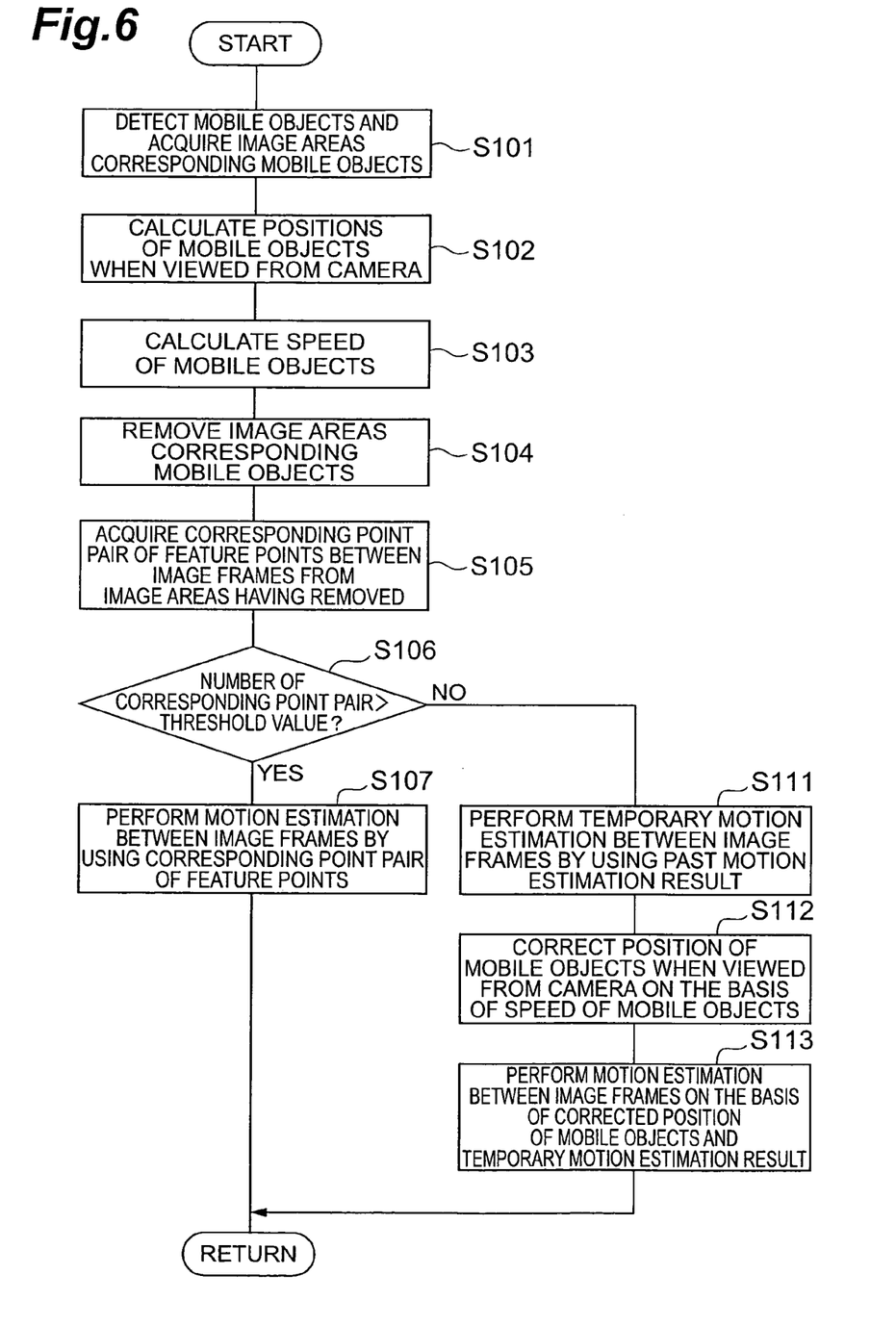
FIG. 6 is a flowchart showing another procedure of the motion estimation processing which is carried out by the motion estimating section shown in FIG. 1.

FIG. 6 is a flowchart showing another procedure of the motion estimation processing which is carried out by the motion estimating section 6. In the drawing, the same steps as those in the flowchart of FIG. 2 are represented by the same reference numerals, and descriptions thereof will be omitted.

In FIG. 6, when it is determined in Step S106 that the number M of corresponding point pairs Pj of feature points is not larger than the threshold value, temporary motion estimation of the autonomous mobile machine between the image frames T and T' is carried out by using the past motion estimation result of the autonomous mobile machine (Step S111).

Next, the position Pi'(Xi',Yi',Zi') of the mobile object Oi' at the time of the image frame T' when viewed from the camera 2 is corrected by using the position Pi of the mobile object Oi and the speed Vi of the mobile object (Step S112). In this case, correction calculation is carried out assuming that the mobile object is moving uniformly at the speed Vi.

Then, the motion estimation of the autonomous mobile machine between the image frames T and T' is carried out on the basis of the positional relationship between the position Pi of the mobile object Oi and the corrected position Pi' of the mobile object Oi', the speed Vi of the mobile object, and the temporary motion estimation result of the autonomous mobile machine (Step S113). In this case, as the motion estimation method, for example, the factorization method or the like may be used, similarly to the above-described step S107.

Note that in Step S113, the motion estimation of the autonomous mobile machine may be carried out by using the positional relationship between the corresponding point pairs Pj of feature points in the image frames T and T'.

In the above description, Step S102 of the motion estimating section 6 constitutes a position detecting section which acquires the position of the mobile object with respect to the imaging device 2. Step S103 of the motion estimating section 6 constitutes a speed detecting section which acquires the speed of the mobile object. Step S111 of the motion estimating section 6 constitutes a temporary estimating section which, when the determining section determines that the number of corresponding feature points is not larger than a predetermined value, estimates the temporary motion state of the autonomous mobile machine on the basis of the past positions of the autonomous mobile machine. Steps S112 and S113 of the motion estimating section 6 constitute a second estimating section which estimates the motion state of the autonomous mobile machine on the basis of the position of the mobile object with respect to the imaging device 2, the speed of the mobile object, and the temporary motion state of the autonomous mobile machine.

In such a configuration, when the known objects A and B are mobile objects, this situation can be recognized. Therefore, as shown in FIG. 5(d), the mobile object after being moved is imaged by the camera 2 to acquire the image frame T', the positional relationship of the mobile object between the image frames T and T' and the speed of the mobile object are acquired, and the movement of the mobile object is predicted, thereby accurately estimating the motion state of the autonomous mobile machine.

The invention is not limited to the foregoing embodiment. For example, while in the foregoing embodiment, the speed Vi of the mobile object is acquired, and when the number of corresponding point pairs of feature points on the stationary object is smaller than the threshold value, the motion estimation is carried out assuming that the mobile object is moving uniformly at the speed Vi, the motion estimation may be carried out taking into consideration a change in the speed of the mobile object, such as acceleration or a jerk, without assuming the mobile object is moving uniformly.

What is claimed is:

1. A motion estimating device that captures images of an ambient environment of an autonomous mobile machine by using an imaging device, and estimates a motion state of the autonomous mobile machine on the basis of a change in respective captured images of the ambient environment, the motion estimating device comprising:
   an image area removing section detecting mobile objects which exist in the respective captured images of the ambient environment, and removing image areas corresponding to the mobile objects;
   a corresponding feature point extracting section extracting corresponding feature points from the respective captured images having removed the image areas corresponding to the mobile objects; and
   a first estimating section estimating the motion state of the autonomous mobile machine on the basis of a positional relationship between the corresponding feature points of the respective captured images.

2. The motion estimating device according to claim 1, further comprising:
   a determining section determining whether or not a number of corresponding feature points is larger than a predetermined value,
   wherein, when the determining section determines that the number of corresponding feature points is larger than the predetermined value, the first estimating section estimates the motion state of the autonomous mobile machine on the basis of the positional relationship between the corresponding feature points of the respective captured images.

3. The motion estimating device according to claim 2, further comprising:
   a second estimating section estimating the motion state of the autonomous mobile machine on the basis of previous positions of the autonomous mobile machine when the determining section determines that the number of corresponding feature points is not larger than the predetermined value.

4. The motion estimating device according to claim 2, further comprising:
   a position detecting section acquiring a position of the mobile object with respect to the imaging device;
   a speed detecting section acquiring a speed of the mobile object;
   a temporary estimating section estimating a temporary motion state of the autonomous mobile machine on the basis of previous positions of the autonomous mobile machine when the determining section determines that the number of corresponding feature points is not larger than the predetermined value; and
   a second estimating section estimating the motion state of the autonomous mobile machine on the basis of the position of the mobile object with respect to the imaging device, the speed of the mobile object, and the temporary motion state of the autonomous mobile machine.

* * * * *